(No Model.)
J. A. DURHAM.
CHEMICAL FIRE EXTINGUISHER.
No. 601,435. Patented Mar. 29, 1898.
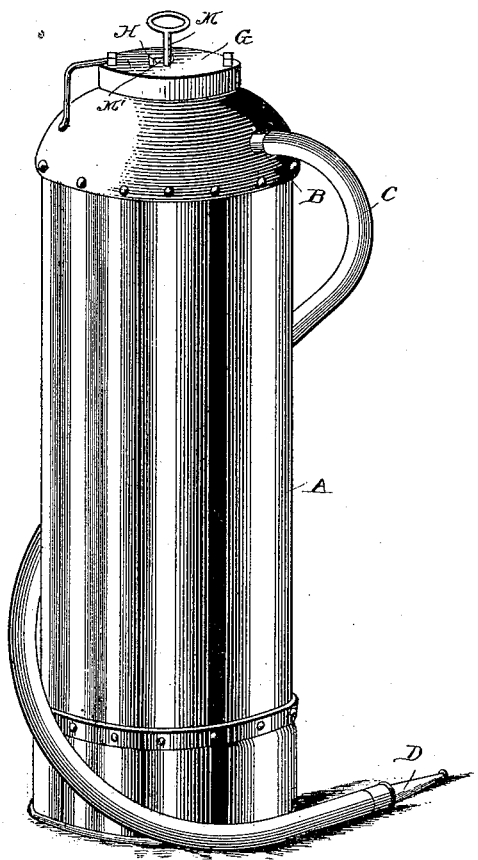
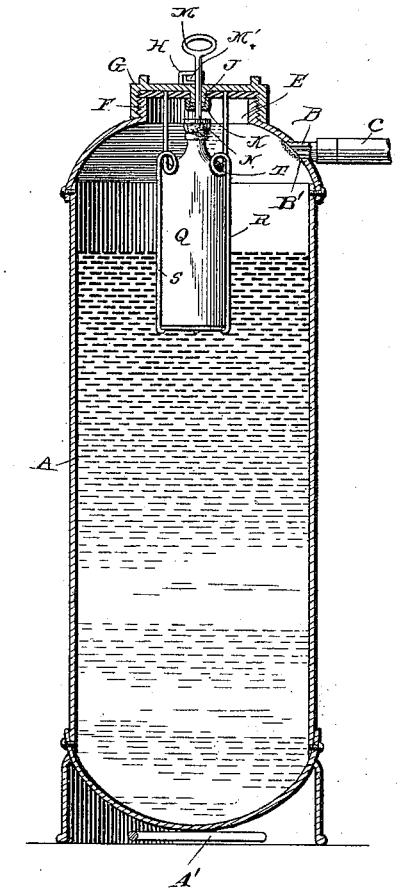
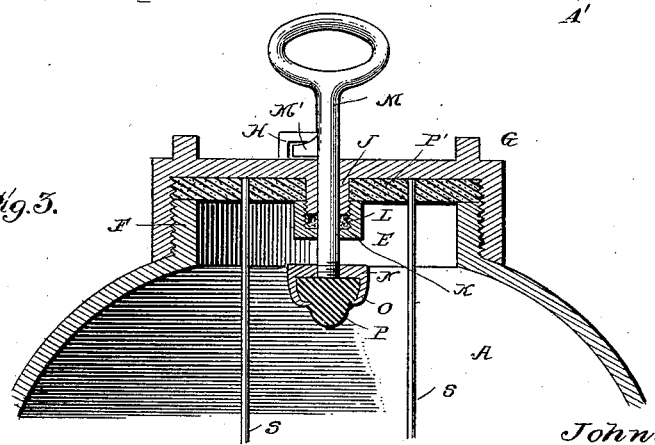
Inventor
John A. Durham.

UNITED STATES PATENT OFFICE.

JOHN A. DURHAM, OF KNOXVILLE, TENNESSEE.

CHEMICAL FIRE-EXTINGUISHER.

SPECIFICATION forming part of Letters Patent No. 601,435, dated March 29, 1898.

Application filed July 22, 1897. Serial No. 645,589. (No model.)

*To all whom it may concern:*

Be it known that I, JOHN A. DURHAM, residing at Knoxville, in the county of Knox and State of Tennessee, have invented a new and useful Chemical Fire-Extinguisher, of which the following is a specification.

My invention has relation to certain improvements in portable fire-extinguishers, and more particularly to the class known as "chemical" extinguishers.

An object of the invention is to provide a chemical fire-extinguisher so constructed that the extinguishing liquid contained within a suitable vessel can be ejected therefrom under pressure in a rapid manner.

A further object of the invention is to provide a chemical fire-extinguisher comprising a vessel to contain a quantity of soda and water or other saline solution, and also to provide means whereby a bottle or receptacle adapted to contain acid that is to be mixed with said saline solution can be removably secured in the upper part of said vessel.

A further object of the invention is to provide a chemical fire-extinguisher comprising a vessel to contain soda and water or the like, and also a vessel to contain acid which is adapted to be mixed with the liquid in the main receptacle, and also to provide means whereby the bottle containing the acid can be opened or held closed at will.

A further object of the invention is to provide a chemical fire-extinguisher simple in construction and composed of but a few inexpensive parts.

With these and other objects in view the invention consists in certain novel features of construction and in combinations and arrangements of parts hereinafter fully described and afterward specifically pointed out in the appended claims.

In order to enable persons skilled in the art to which my invention most nearly appertains to make and use the same, I will now proceed to describe its construction and operation, reference being had to the accompanying drawings, forming part of this specification, in which—

Figure 1 is a perspective view showing my device in operative position. Fig. 2 is a vertical sectional view. Fig. 3 is an enlarged sectional view showing the upper part of the vessel and the valve or stopper operating mechanism.

Like letters of reference mark the same parts wherever they occur throughout the various figures of the drawings.

In the practical embodiment of my invention I have shown a vessel A to contain soda and water or other saline solution, this vessel being closed at its bottom and being provided with a wire handle A'. This vessel is also provided near its upper portion with a discharge-pipe connection B, with strainer B', to which one end of a hose C can be attached, the opposite end thereof being provided with a nozzle D. An opening E is arranged in the top portion of the vessel, and F indicates an annular flange screw-threaded on its exterior to receive a cap G, having on its upper surface a catch H, the purpose of which will be shortly described. This cap is provided with a central opening I, and a threaded sleeve J extends downwardly from the under side of the same to screw into a chamber K to provide for an open space between the lower end of said sleeve and the bottom of the chamber, which is filled with any suitable packing L, so that a stuffing-box is formed for the key M, which passes through the cap and said box. This key is provided with a projecting part M' on one side thereof, and the lower portion of the stem is screw-threaded to screw into a disk N, having the downwardly-projecting fingers O, which are bent around a valve or rubber stopper P.

P' indicates a washer, of any suitable material, interposed between the upper part of the vessel and beneath the cap, so as to provide for a tight joint at this point.

The stopper just mentioned is adapted to fit the mouth of a bottle Q, which will contain acid, said bottle to be seated in a wire basket R, said basket consisting of a base and the vertical spring-wire rods S, which are looped, as shown at T, to provide for the spring portion, and the upper free ends thereof are secured to the under side of the cap-piece in any suitable manner. By forming this basket with the upwardly-extending vertical wires and the loops formed therein the several portions comprising the receptacle will readily yield, so that the bottle can be easily removed therefrom and can be securely held in place after having once been inserted between the same.

When it is desired to use the extinguisher, the key is turned, permitting the projection formed on the side of the stem thereof to be released from engagement with the catch H on the cap when the stopper or valve can be raised from the mouth of the bottle. The vessel is then turned bottom end up, allowing the acid contained in the bottle to escape into the said vessel, when the same becomes thoroughly mixed with the saline solution to create the carbonic gas to eject the liquid contained within the vessel through the discharge and into the hose or tube and through the nozzle thereof at a high rate of speed, it of course being understood that as the vessel is held in this position by one hand of the operator the hose or tube will be handled by the other.

From the foregoing description it will be seen that I have produced an exceedingly cheap and simple construction of portable fire-extinguisher, that I also provide an approved construction of basket to retain the bottle containing the acid, and that means are also provided whereby a stopper or valve can be inserted or removed from the mouth of the vessel, as occasion may require, in a simple and rapid manner.

I do not care to limit myself to any particular shape of vessel nor to the exact operating mechanism for removing the stopper or valve from the bottle containing the acid, and it is evident that various slight changes might be made in the forms, constructions, and arrangements of the several parts herein described without departing from the spirit and scope of my invention. Hence I do not care to limit myself to the precise arrangement herein specified, but hold that I am entitled to any slight variations or changes therein as may fall within the limit and scope thereof.

Having thus fully described my invention, what I claim as new, and desire to secure by Letters Patent, is—

1. A chemical fire-extinguisher comprising a main receptacle having an opening in its top provided with an air-tight cap, a discharge-pipe for said main receptacle, a wire holder depending from the bottom of said cap adapted to hold an acid-bottle, said holder being formed with spring-coils, so that it will readily yield to allow the said bottle to be removed or inserted, a rod moving vertically through the said cap carrying on its lower end a flexible stopper adapted to close the mouth of the bottle, and a locking device provided on said vertical rod, substantially as described and for the purpose stated.

2. A chemical fire-extinguisher consisting of the main receptacle provided with a discharge-opening and having in its top an opening provided with an air-tight cap, of a depending spring-basket adapted to hold an acid-bottle secured in the bottom of said cap, a vertically-moving rod provided with a flexible stopper on its lower end adapted to close the mouth of the bottle and having on its upper projecting end a detent adapted to engage the catch secured on the outside of the cap, substantially as described.

JOHN A. DURHAM.

Witnesses:
N. OSTFELD,
W. H. WILLS.